T. E. DWYER.
STOP COCK.
APPLICATION FILED JULY 7, 1908.

904,852.

Patented Nov. 24, 1908.

WITNESSES
E. Batchelder
F. R. Roulstone

INVENTOR
J. E. Dwyer
BY Wright Brown Quinby May
ATTORNEYS

THE NORRIS PETERS CO., WASHINGTON, D. C.

UNITED STATES PATENT OFFICE.

THOMAS E. DWYER, OF WAKEFIELD, MASSACHUSETTS.

STOP-COCK.

No. 904,852.

Specification of Letters Patent.

Patented Nov. 24, 1908.

Application filed July 7, 1908. Serial No. 442,389.

*To all whom it may concern:*

Be it known that I, THOMAS E. DWYER, of Wakefield, in the county of Middlesex and State of Massachusetts, have invented certain new and useful Improvements in Stop-Cocks, of which the following is a specification.

This invention relates to stop cocks in which the contacting surface of the casing and the rotary plug, as well as the passages through the casing and plug, have inoxidizable surfaces in contact with the liquid passing through the cock, to prevent injury to the cock by saline and acid solutions passing through it. Lead has been usually employed as the protecting material in cocks of this character, both the casing and the plug being provided with a lead lining, which, when the cock is open, forms a continuous acid-resisting wall for the passage through the cock.

A practical difficulty has been experienced in plugs of this character due to the tendency of the lead lining of the plug to adhere to the lead lining of the casing, particularly when the plug has been left in one position for a considerable length of time, this tendency resulting in many cases in the breakage or injury of the lining when the plug is moved.

My invention has for its object to provide a stop cock of this character in which the extent of contact between the protective lining of the casing and the plug shall be reduced to the minimum, the liability of injury to the linings from the cause above stated being correspondingly reduced and practically eliminated.

The invention consists in the improvements which I will now proceed to describe and claim.

Figure 1:
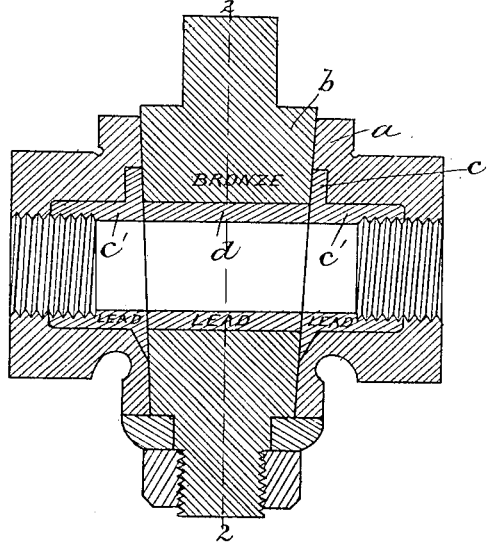
Figure 2:
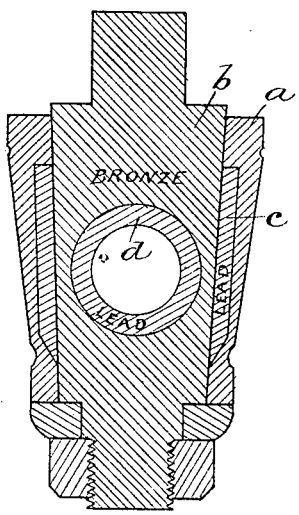

Of the accompanying drawings forming a part of this specification, Figure 1 represents a longitudinal central section of a stop cock embodying my invention. Fig. 2 represents a section on line 2—2 of Fig. 1.

In the drawings, $a$ represents the casing and $b$ the plug of a stop cock, the plug being a truncated cone and having a transverse passage extending through it, while the casing has a tapered socket accurately fitting the plug, and provided with internally threaded end portions adapted to engage lengths of screw-threaded pipe.

$c$ represents a casing of lead applied as a lining or bushing to the casing $a$, and having tubular extensions or flanges $c'$ which project into the internally threaded end portions of the casing. The plug passage is provided with a lead lining or bushing $d$, the thickness of which is preferably substantially the same as that of the linings $c$ of the casing.

In carrying out my invention, instead of providing the plug lining $d$ with extensions or flanges extending outwardly to bear against the entire inner surface of the lining $c$, I limit the area of the lead surface at the exterior of the plug to the thickness of the lining $d$, and make the body portion of the plug of bronze, or other relatively hard acid-proof metal. The bronze body portion of the plug is in contact with the lining $c$ of the casing, and is free from liability to adhere to said lining. The only portions of the lead lining of the plug which are in rubbing contact with the lead lining of the casing are the relatively narrow ends of the lead lining, said ends being of the same thickness as the lining. This relatively narrow area of contact between the two linings prevents excessive sticking of the lining of the plug to the lining of the casing. Any leakage of liquid through the joint between the two linings is rendered innocuous by the bronze body of the plug, which has a close fit against the lining $c$ of the casing, so that the liquid is not liable to find its way outwardly far enough to attack the body of the casing which is usually made of iron, or other relatively cheap material.

It will be seen, therefore, from the foregoing, that provision is made for protecting the oxidizable portion of the body of the casing by inoxidizable metal, and at the same time, preventing liability of the adhesion of the linings of the plug and casing to each other.

I claim:

A stop cock comprising a casing having a plug socket and pipe-engaging end portions, said socket and end portions having a lead lining, and a plug fitted to rotate in said socket and composed of a body of relatively hard acid-resisting metal such as bronze, which is in contact with the end portions of the lead lining of the socket, the passage
5 through the plug being provided with a tubular lead lining, the ends of which are in contact with the lead lining of the socket.

In testimony whereof I have affixed my signature, in presence of two witnesses.

THOMAS E. DWYER.

Witnesses:
C. F. Brown,
P. W. Pezzetti.